United States Patent [19]

Tajima

[11] Patent Number: 5,365,352
[45] Date of Patent: Nov. 15, 1994

[54] IMAGE READING APPARATUS HAVING COLOR IMAGE SENSOR IN WHICH A PLURALITY OF CCD ARRAYS ARE FORMED INTEGRALLY ON ONE CHIP

[75] Inventor: Katsuaki Tajima, Toyokawa, Japan

[73] Assignee: Minolta Camera Kabushiki Kaisha, Osaka, Japan

[21] Appl. No.: 848,853

[22] Filed: Mar. 10, 1992

[30] Foreign Application Priority Data

Mar. 15, 1991 [JP] Japan ................................ 3-077047
Mar. 15, 1991 [JP] Japan ................................ 3-077048

[51] Int. Cl.⁵ .............................................. H04N 1/46
[52] U.S. Cl. ...................................... 358/500; 358/530; 358/505; 358/514; 358/482; 358/483
[58] Field of Search ................. 358/75, 78, 80, 443, 358/474, 213.11, 448, 44, 41, 500, 530, 505, 514, 515, 513, 512

[56] References Cited

U.S. PATENT DOCUMENTS

| | | | |
|---|---|---|---|
| 4,264,921 | 4/1981 | Pennington et al. | 358/78 |
| 4,551,750 | 11/1985 | Kurata | 358/75 |
| 4,553,160 | 11/1985 | Yamamoto et al. | 358/75 |
| 4,866,512 | 9/1989 | Hirosawa et al. | 358/75 |
| 4,972,255 | 11/1990 | Suzuki et al. | 358/513 |
| 4,999,717 | 3/1991 | Nagashima | 358/474 |
| 5,027,195 | 6/1991 | Cooley et al. | 358/44 |

FOREIGN PATENT DOCUMENTS

62-26634  6/1987  Japan .............................. H04N 1/46

Primary Examiner—Edward L. Coles, Sr.
Assistant Examiner—Jerome Grant, III
Attorney, Agent, or Firm—Burns, Doane, Swecker & Mathis

[57] ABSTRACT

An image reading apparatus according to the present invention includes a image reading device including a color image sensor in which three CCD arrays arranged parallel with each other for reading different color components included in an image of the original, respectively, are formed integrally on one chip, wherein each of the CCD arrays reads the image of the original by a predetermined number of pixels to provide image data, a scanning device for moving the color image sensor and the image of the original relatively in a direction vertical to the CCD arrays, a color discriminating device for discriminating the color of the image of the original for every pixel on the basis of the image data from at least two of the CCD arrays included in the image reading device, and an output device for outputting the image data from particular one of the CCD arrays included in the image reading device and a discrimination result from the color discrimination device in synchronism with each other.

17 Claims, 11 Drawing Sheets

IMAGE READING APPARATUS HAVING COLOR IMAGE SENSOR IN WHICH A PLURALITY OF CCD ARRAYS ARE FORMED INTEGRALLY ON ONE CHIP

BACKGROUND OF THE INVENTION

1. Field of the Invention

The present invention relates to image reading apparatuses and, more particularly, to an image reading apparatus used as image input means in a digital copying machine or a filing system.

2. Description of the Related Art

A digital copying machine includes an image reading apparatus for reading an image of the original and a page printer for printing the read image.

Conventionally, there is a digital copying machine capable of performing multicolor printing in black and red, for example, and having a function of copying an image of the original of two colors of black and red with the colors being reproduced and a function of editing and copying an image whereby a blue part of an image of the original of two colors of black and blue is printed in red, for example.

In such a copying machine, color discrimination is performed on an image of the original for every pixel in an image reading apparatus, and color discrimination data is provided to a page printer in synchronism with monochromatic image data read from the image of the original.

Generally, discrimination of colors of an image is carried out by performing color separation on scanning light from an image of the original with spectroscopic means such as a filter, a prism, or the like and comparing the light intensity of respective separated colors.

As described in Japanese Patent Publication No. 62-26634 (1987), in a conventional image reading apparatus, a plurality of photoelectric transfer means separated from each other are arranged in predetermined positions, scanning light of respective separated colors separated into two colors is made to be incident upon the photoelectric transfer means, respectively, and color discrimination for discriminating whether the color of each pixel is a specified color or not is performed on the basis of the ratio between the levels of output signals of respective photoelectric transfer means.

Image data is generated by quantizing outputs of respective photoelectric transfer means used in color discrimination, i.e. photoelectric transfer signals corresponding to respective separated colors and then synthesizing the outputs by signal processing. Specifically, image data obtained by scanning is optically separated and then electrically resynthesized.

In the conventional image reading apparatus, there is the possibility that image data provided to the outside of the image reading apparatus is deteriorated by discrepancy between spectral characteristics and signal processing characteristics of an optical system.

SUMMARY OF THE INVENTION

An object of the present invention is to provide an image reading apparatus capable of providing image data which can be reproduced correctly to an image of the original.

In order to achieve the above object, an image reading apparatus according to the present invention includes a color image sensor in which three CCD arrays are formed integrally on one chip for reading an image of the original, with color separation being performed on the image of the original to separate the color into at least two colors or more, to provide image data DR, DG and DB corresponding to respective separated colors, a color discrimination ROM for discriminating the color of each pixel in the image of the original on the basis of image data corresponding to respective colors of two or more colors out of respective separated colors R, G and B of the color image sensor, and data transmission delaying means 203 for providing image data DG corresponding to one color out of respective separated colors R, G and B of the color image sensor in synchronism with color discrimination data DC provided from the color discrimination ROM.

In an image reading apparatus constructed as described above, there is no positional and optical discrepancy among respective colors of R, G and B in color separation performed on an image of the original, so that it becomes possible to perform color discrimination with high precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
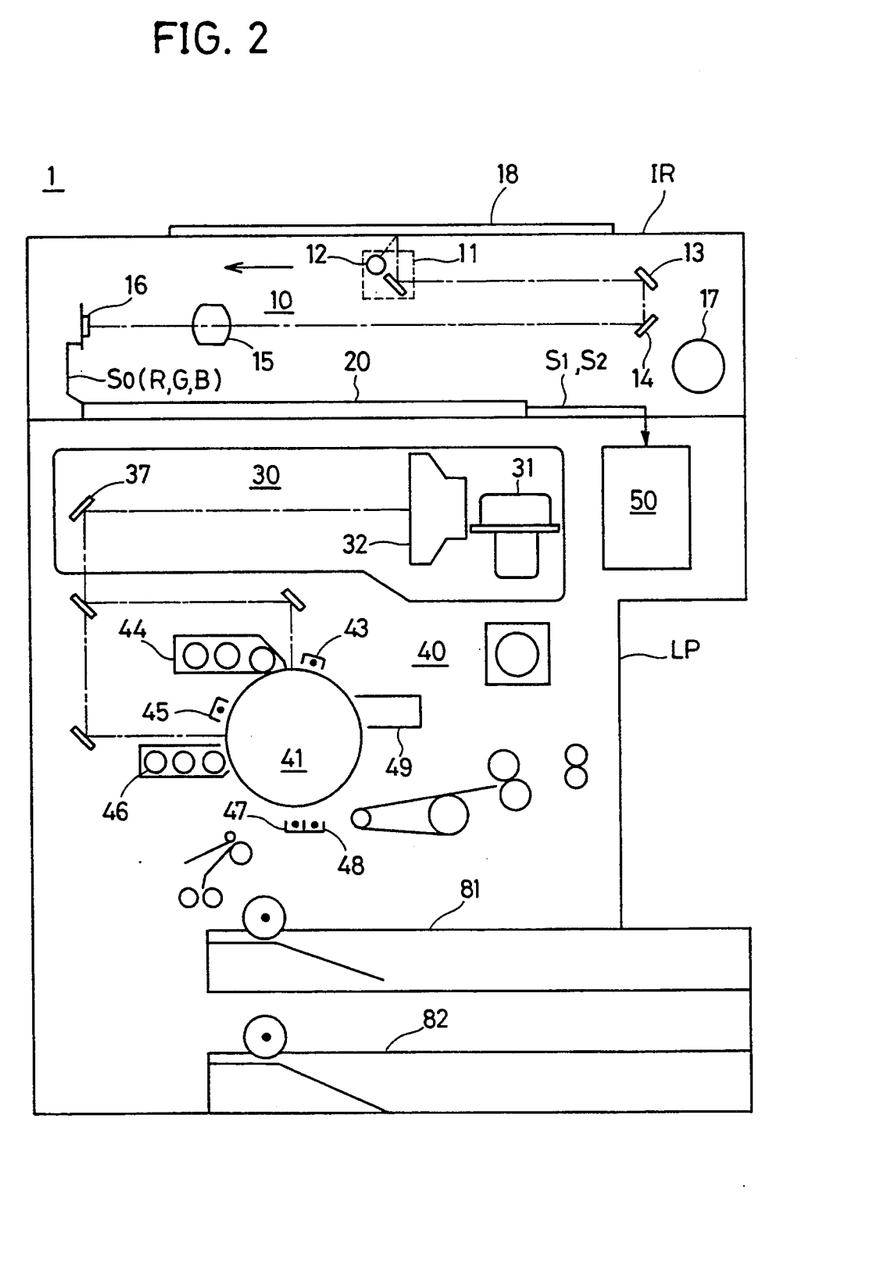
FIG. 2 is a cross sectional front view illustrating a schematic structure of a copying machine according to the first embodiment of the present invention.

FIG. 2 is a cross sectional front view illustrating a schematic structure of a copying machine 1 according to a first embodiment of the present invention.

Copying machine 1 includes an image reader part IR for providing image data obtained by scanning an image of the original as an image signal S1 and a laser printer part LP for forming a copy image of one color or two colors on the basis of image signal S1 by an electrophotographic method.

In image reader part IR, an optical system 10 includes a scanner 11 capable of reciprocating under an original glass plate 18, mirrors 13 and 14, a main lens 15, a full color image sensor (hereinafter referred to as "an image sensor") 16, and so forth. Scanner 11 has an exposure lamp 12 for irradiating the original and is driven by a motor 17 to scan the original placed on platen glass 18.

An image of the original is read as color signals of additive three primary colors of R (red), G (green) and B (blue) by image sensor 16. A photoelectric transfer signal S0, which is an output of image sensor 16, is quantized by a signal processing part 20, and, after various signal processing is performed thereon in accordance with the copying mode, is transmitted as image signal S1 to laser printer part LP.

Laser printer part LP includes a laser optical system 30 using a semiconductor laser (not shown) as a light source and an image forming system 40 for carrying out electrophotographic process using a photoreceptor drum 41.

Laser optical system 30 includes a polygon mirror 31, a Fθ lens 32, a reflecting mirror 37, and so forth and projects laser light controlled by a controlling part 50 on the basis of image signal S1 to expose photoreceptor drum 41.

In image forming system 40, a corona charger 43 and a developing device 44 for forming an image of a first color, a corona charger 45 and a developing device 46 for forming an image of a second color, a transfer charger 47, a copy paper separation charger 48, a cleaner 49, and so forth are arranged on the periphery of photoreceptor drum 41.

A latent image corresponding to the image of the original is formed on the surface of photoreceptor drum 41 charged by corona chargers 43 and 45 by the above-described exposure. The latent image is developed as a toner image by one or both of developing devices 44 and 46. The toner image is transferred to paper fed from paper cassettes 81 or 82.

While it is possible to arbitrarily select the development color of developing devices 44 and 46 by exchanging toner, it is now assumed that the development color of developing device 44 is black, for example, and the development color of developing device 46 is red, for example.

Now, the editing and copying function of copying machine 1 will be described. In a normal copying mode, a monochromatic image of black is formed using only developing device 44 regardless of the color of the original. On the other hand, in an editing and copying mode, a part of a specified color in an image of the original is copied in red by developing device 46. Colors of three types, "red", "blue" and "red and blue", can be selected in copying machine 1 as the specified color at this time.

An operation panel (not shown) is provided with operation keys 71 and 72 (See FIG. 1) corresponding to specified colors, "red" and "blue", and, if operation key 71 is pressed, the specified color becomes "red", and, if operation key 72 is pressed, the specified color becomes "blue". If operation keys 71 and 72 are pressed, the specified color becomes "red or blue". For example, if an operator specifies "red or blue" as the specified color on the occasion of editing and copying, parts in red and parts in blue in an image of the original are copied in red, and the other parts are copied in black.

In order to achieve such editing and copying, the color of each pixel in an image of the original is discriminated (color discrimination) in signal processing part 20 in image reader part (IR) as will be described later. Then, color discrimination data DC obtained as a result of the discrimination is provided as an editing signal S2 to laser printer part LP in synchronism with image data (image signal S1).

Laser printer part LP forms an image of two colors as described above on the basis of editing signal S2 in the editing and copying mode.

Figure 3:
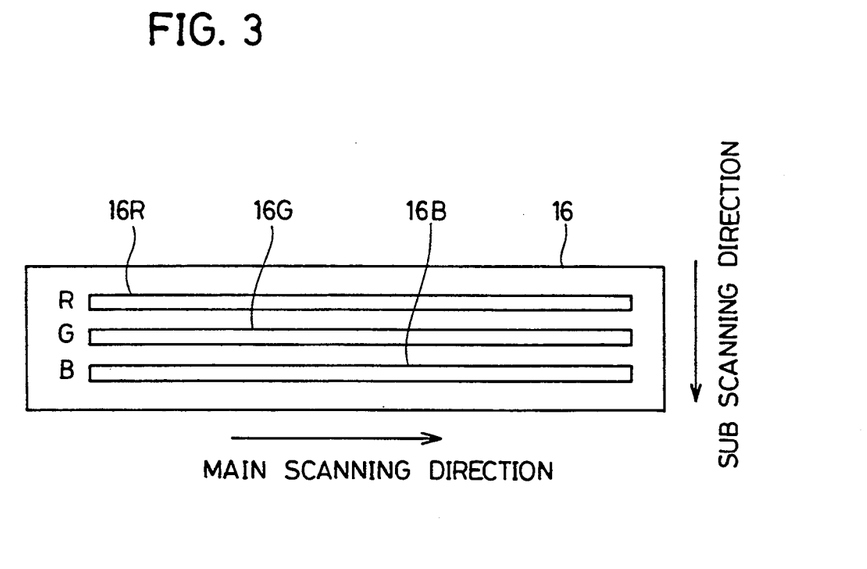
FIG. 3 is a plan view of an image sensor in FIG. 2.
Figure 4:
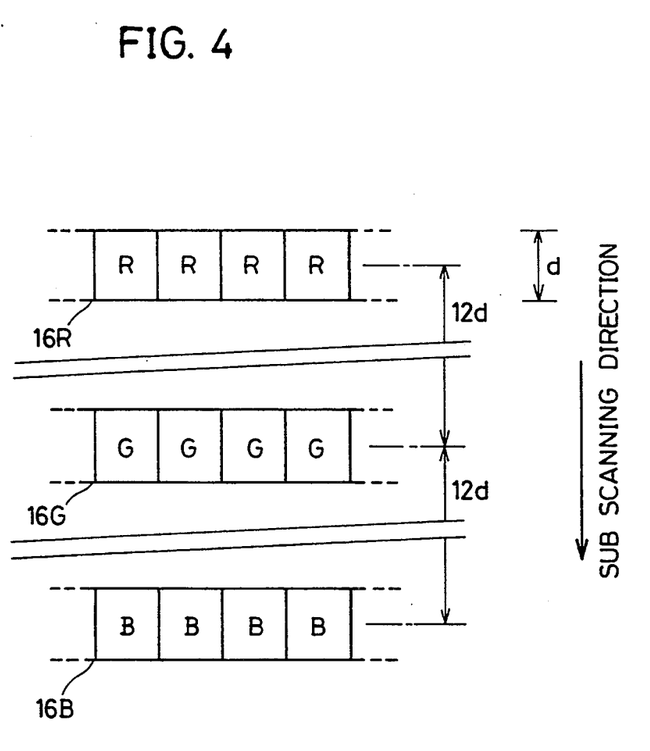
FIG. 4 is a plan view illustrating a part of FIG. 3 being enlarged.

FIG. 3 is a plan view of image sensor 16, and FIG. 4 is a plan view illustrating a part of FIG. 3 being enlarged.

Image sensor 16 is a solid state imaging device of one chip in which three CCD arrays 16R, 16G and 16B extending in the main scanning direction of scanning of the original are integrated. Each of CCD arrays 16R, 16G and 16B has elements of a CCD corresponding to 5000 pixels and is capable of reading the original of the size of A3 with resolution of 16 lines/mm. Spectroscopic filters which transmit light of R, G and B, respectively, are provided on light receiving surfaces of CCD arrays 16R, 16G and 16B for reading the image of the original with the color being separated into three primary colors.

In addition, in image sensor 16, CCD arrays 16R, 16G and 16B are arranged parallel with each other with pitch of 12 pixels (i.e. of 12 lines) being provided in the direction of sub scanning. Therefore, as to the same pixel, the timing of outputting a photoelectric transfer signal from CCD array 16G is delayed by a constant time (a time for sub scanning of 12 lines) as compared with the output timing of CCD array 16R, and the output timing of CCD array 16B is delayed by the same time as compared with the output timing of CCD array 16G. Specifically, the image sensor 16 separates the color of pixels into three colors while reading the image, and provide image data of R, G and B in that order with a constant delay. The speed of sub scanning is changed in accordance with the copying magnification, so that delay between the output timing of respective colors is also increased or decreased in accordance with the copying magnification.

Figure 1:
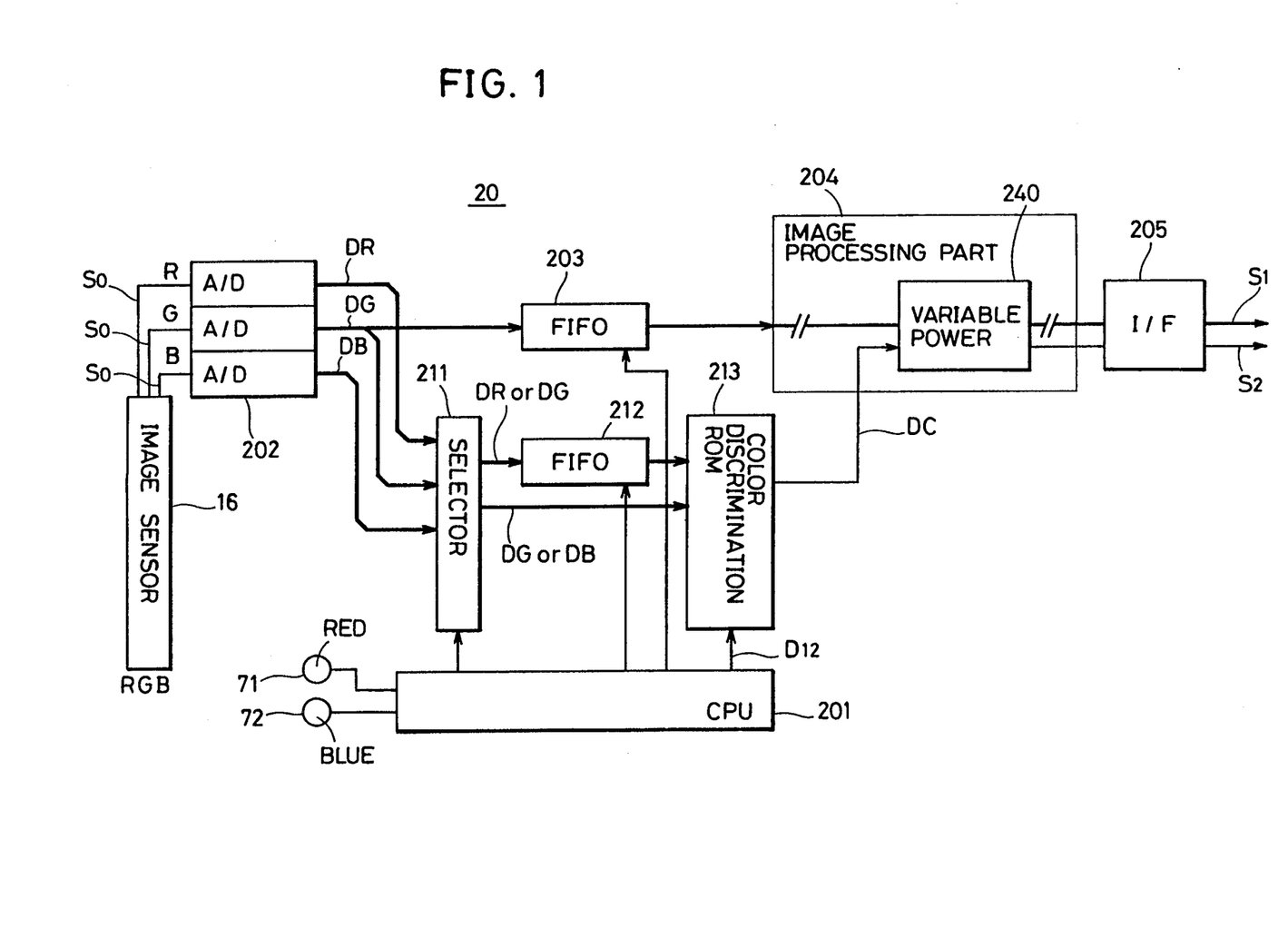
FIG. 1 is a block diagram illustrating a structure of a signal processing part in an image reader part according to a first embodiment of the present invention.

FIG. 1 is a block diagram illustrating a structure of signal processing part 20.

Photoelectric transfer signals S0 of respective colors of R, G and B provided from image sensor 16 are applied to input processing part 202. Input processing part 202 amplifies photoelectric transfer signals S0 of respective colors to predetermined levels, respectively, then quantizes them by A/D conversion, performs shading correction on them, and provides them as image data DR, DG and DB of 8 bits (256 tones).

Image data DR, DG and DB are applied to a selector 211 for color discrimination. Selector 211 is controlled by a CPU 201 and selects image data of two colors out of image data DR, DG and DB of three colors in accordance with a specified color of image editing specified with operation keys 71 and 72 as described above to provide them as an output.

When the specified color is red, image data DR and DG of R and G are selected, and when the specified color is blue, image data DG and DB of G and B are selected. When the specified color is red or blue, image data DR and DB of R and B are selected.

The image data of two colors selected by selector 211 are applied as an address input to a color discrimination ROM 213. One of the image data of the two colors is delayed by a first-in first-out memory (FIFO memory) 212 by a predetermined time and applied to color discrimination ROM 213 with its timing being synchronized with the timing of the other image data.

Specifically, FIFO memory 212 is provided for compensating delay between the output timing of signals S0, which is caused by arrangement (See FIG. 4) of CCD arrays 16R, 16G and 16B in image sensor 16, and delays the data of 8 bits by a data transmission time corresponding to the sub scanning time for 24 lines at a maximum in accordance with control of reading performed by CPU 201.

In a case where the output of selector 211 is image data DR and DG, image data DR is delayed by 12 lines, and in a case where the output of selector 211 is image data DG and DB, image data DG is delayed by 12 lines. In a case where the output of selector 211 is image data DR and DB, image data DR is delayed by 24 lines.

Color discrimination ROM 213 discriminates the color of the image of the original for every pixel on the basis of the image data of two colors and specified color data D12 of two bits applied from CPU 201. Color discrimination tables TRG, TBG and TRB corresponding to colors to be specified are stored in color discrimination ROM 213. Specifically, data of two bits indicating a value of color discrimination data DC to be an output is stored in address determined by values of "0"–"3" of specification color data D12 and values of "0"–"255" of respective image data of two colors.

FIGS. 5(a)–(d) are diagrams schematically illustrating the contents of color discrimination tables TRG, TBG and TRB.

Figure 5A:
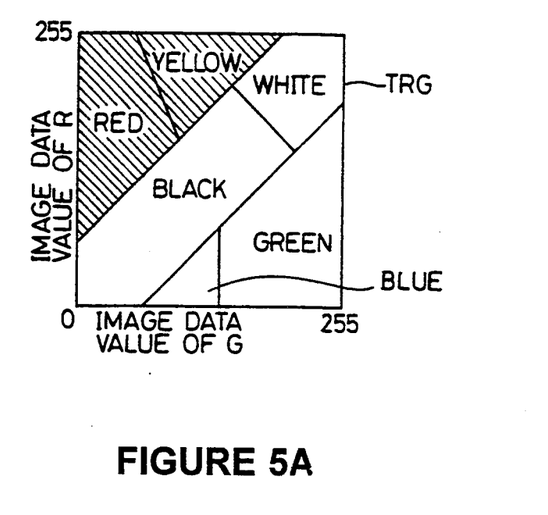
FIG. 5A–5D is a diagram schematically illustrating the contents of color discrimination tables included in a color discrimination ROM in FIG. 1.
Figure 5B:
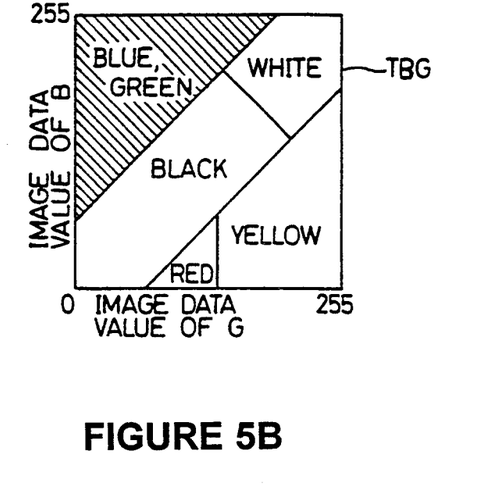
Figure 5C:
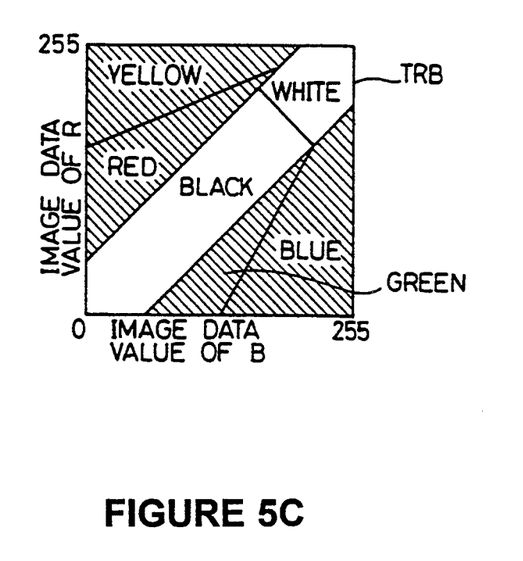
Figure 5D:
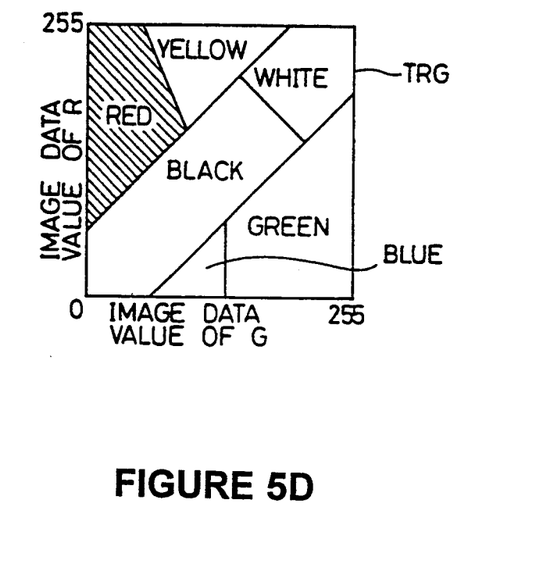

In a case where the specified color is "red", two colors of R and G are selected out of three colors of R, G and B as described above, and color discrimination is performed using color discrimination table TRG in FIG. 5(a). Namely, it is easy to discriminate red from the other colors with table TRG in FIG. 5(a) by using R and G in color discrimination, because there are many combinations generating red in combinations of values of two image data, i.e. the region corresponding to red in FIG. 5(a) is larger than that in table TBG in FIG. 5(b). In a case where the specified color is "red", color discrimination table TRG may also be the table illustrated in FIG. 5(d) besides the table illustrated in FIG. 5(a).

In color discrimination table TRG, when the combination of the values of image data DR and DG is a combination corresponding to a color in a red family (red and part of yellow) indicated by oblique lines in FIG. 5 (a), the value of color discrimination data DC is made to be "1", and, in the case of the other combinations, the value of color discrimination data DC is made to be "0".

In a case where the specified color is "blue", two colors of G and B are selected to make it easy to discriminate colors in a blue family (blue and green) from other colors, and color discrimination is performed using color discrimination table TBG. In color discrimination table TBG, when the combination of the values of image data DB and DG is a combination corresponding to a color in the blue family indicated by oblique lines in FIG. 5(b), the value of color discrimination data DC is made to be "2", and, in the case of the other combinations, the value of color discrimination data DC is made to be "0".

In a case where the specified color is "red or blue", two colors of R and B are selected for color discrimination, and color discrimination is performed using color discrimination table TRB. In color discrimination table TRB, when the combination of the values of image data DR and DB is a combination corresponding to a color in the red family or the blue family indicated by oblique lines in FIG. 5(c), the value of color discrimination data DC is made to be "3", and, in the case of the other combinations, the value of color discrimination data DC is made to be "0".

Referring to FIG. 1 again, image data DG of G out of image data DR, DG and DB of three colors provided from input processing part 202 is extracted as image data read from the image of the original and transmitted through FIFO memory 203 to image processing part 204.

Now, G is the color in the wavelength region which has the highest spectral luminous efficiency in R, G and B. Specifically, the density of the image of the original is recognized mainly with the light intensity of G by naked eyes. Accordingly, in a case where the image of the original is copied as an image with various density of one color (black) or two colors (black and red), it is possible to obtain a copy image which stands comparison in respect of picture quality by using image data DG.

FIFO memory 203 is provided for synchronizing the transmission timing of color discrimination data DC and that of image data DG and delays image data DG by data transmission time for 12 lines by control of reading performed by CPU 201 only when image data DB of B is included in the outputs of selector 211.

Image processing part 204 performs various image processing including gamma correction for correctly reproducing the density of the image of the original, edge emphasizing and smoothing for improving the picture quality, or the like on image data DG.

In addition, image processing part 204 is provided with a variable power processing part 240 for duplicating a pixel in accordance with copying magnification or thinning out a pixel. Color discrimination data DC is also applied to variable power processing part 240 in synchronism with image data DG, and variable power processing is also performed on color discrimination data DC as well as on image data DG.

Image data DG and color discrimination data DC provided from image processing part 204 are provided as image signal S1 and editing signal S2, respectively, through an output interface 205 to laser printer part LP.

The power form of image signal S1 may still be a digital signal of 8 bits indicating the image density, or it may be bit data made binary by a dither method or the like. It may also be an analog signal.

In the first embodiment described above, CCD arrays 16R, 16G and 16B in image sensor 16 may be arranged in the order of B, G, and R in the sub scanning direction. In addition, it is possible to make the order of arrangement of CCD arrays 16R, 16G and 16B arbitrary by suitably changing the subject of data delaying and the delaying time.

Although a structure in which an image of the original is sequentially read by CCDs in a plurality of lines and outputs from respective CCDs are synchronized by a delaying memory is described in the above embodiment, a structure in which light from the image of the original is separated into its spectral components and made to be incident simultaneously to respective CCDs may also be used.

Figure 6:
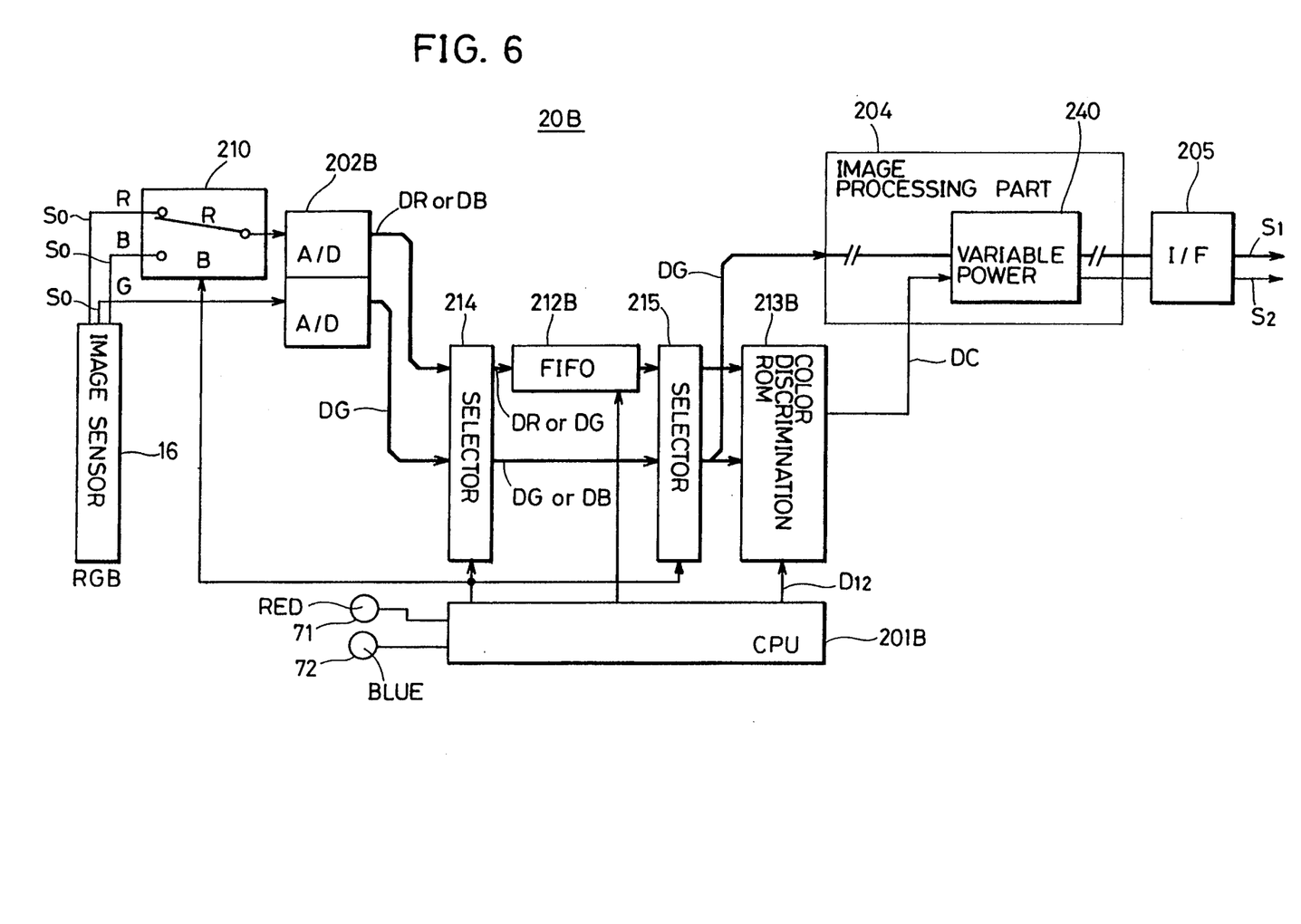
FIG. 6 is a block diagram of a signal processing part according to a second embodiment of the present invention.

FIG. 6 is a block diagram of a signal processing part 20B according to a second embodiment of the present invention. In FIG. 6, components having the same functions as components in FIG. 1 have are given the same reference numerals, and components corresponding to components in FIG. 1 are given the same reference numerals with "B" added thereto.

Referring also to FIG. 4, in signal processing part 20B, photoelectric transfer signals S0 of R and B provided from CCD arrays 16R and 16B in the front row and the last row in the sub scanning direction of image sensor 16 are applied as selection inputs to a selector 210 including an analog switch. One of photoelectric transfer signals S0 of R and B selected by selector 210 and a photoelectric transfer signal S0 of G are applied to an input processing part 202B.

In input processing part 202B, the reference voltage of A/D conversion is changed in accordance with a selecting operation of selector 210 to compensate an offset (a difference of the levels) between photoelectric transfer signals S0 of R and B. It is also possible to compensate the offset by changing the amplification factor on the occasion of amplification before A/D conversion.

Image data DR or image data DB and image data DG which are provided from input processing part 202B are applied to a selector 214. Selector 214 provides image data corresponding to the color on the side of the front row in the sub scanning direction in image sensor 16 out of the applied image data of two colors to FIFO 212B and provides image data corresponding to the color on the side of the back row in the sub scanning direction to a selector 215.

A FIFO memory 212B has a storage capacity which makes it possible to delay data of 8 bits by data transmission time for 12 lines.

Selector 215 changes over correspondence between input and output so that one image data DG of G out of image data of the two colors applied from selector 214 and FIFO 212B, respectively, is applied both to a color discrimination ROM 213B and to an image processing part 204, and so that the other image data DR or DB of R or B is applied only to color discrimination ROM 213B.

Selector 210 and selectors 214, 215 are all controlled by a CPU 201B in accordance with the above-described specified color of image editing which is specified with operation keys 71 and 72.

When the specified color is red, selector 210 selects signal S0 from CCD array 16R as an output therefrom to input processing part 202B. Then, selector 214 applies image data DR to FIFO memory 212B and applies image data DG directly to selector 215 not through FIFO memory 212B. When the specified color is blue, selector 210 selects signal S0 from CCD array 16B as an output therefrom to input processing part 202B, and selector 214 applies image data DG to FIFO memory 212B. Selector 215 applies one of image data DR and DB and image data DG to color discrimination ROM 213B and applies image data DG to image processing part 204 regardless of the specified color.

CPU 201B performs control of reading over FIFO memory 212B so as to delay image data DR or DG by 12 lines. By doing this, image data DR or DB and image data DG corresponding to the same pixel are applied simultaneously to color discrimination ROM 213B.

Color discrimination ROM 213B uses color discrimination table TRG or color discrimination table TBG in accordance with specified color data D12 and provides color discrimination data DC of a predetermined value in accordance with the combination of the values of image data DR and DG of R and G or the combination of the values of image data DB and DG of B and G.

Figure 7:
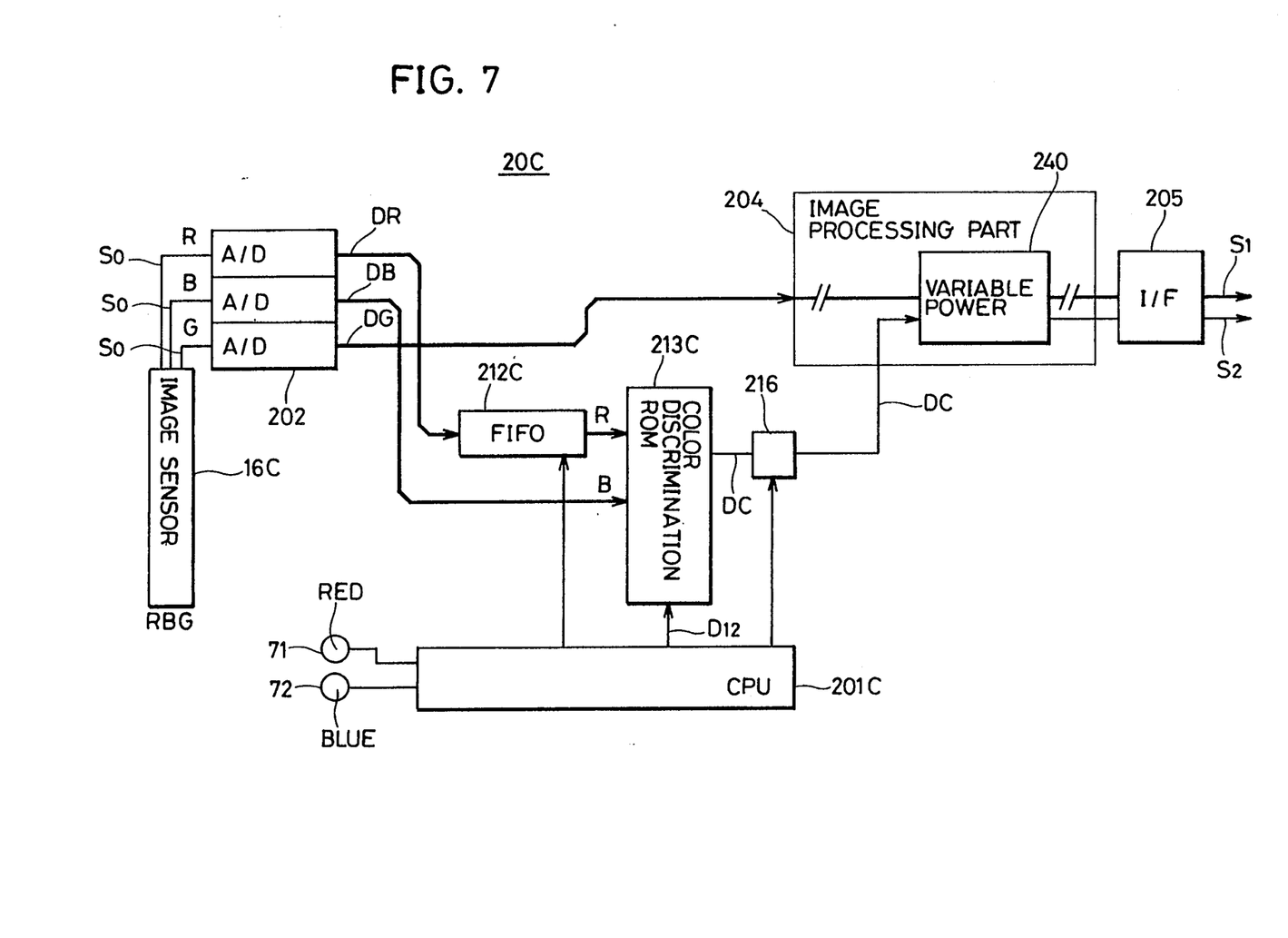
FIG. 7 is a block diagram of a signal processing part according to a third embodiment of the present invention.
Figure 8:
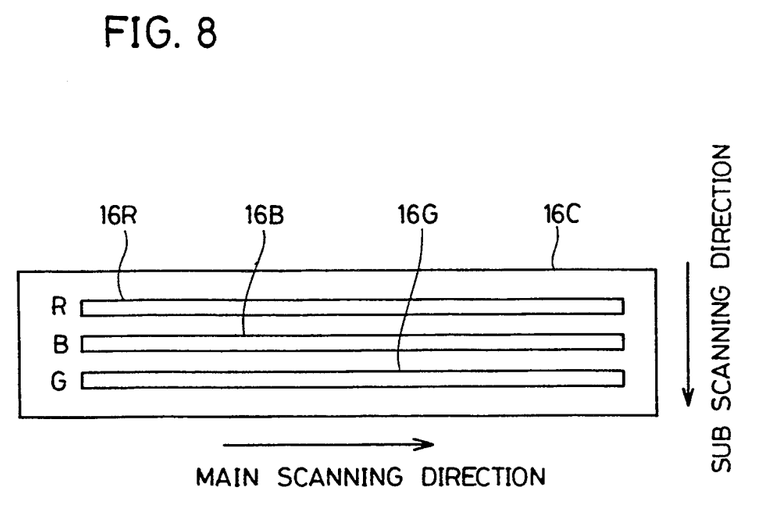
FIG. 8 is a plan view of an image sensor applied in the signal processing part in FIG. 7.

FIG. 7 is a block diagram of a signal processing part 20C according to a third embodiment of the present invention, and FIG. 8 is a plan view of an image sensor 16C applied in signal processing part 20C in FIG. 7. In FIG. 7, components having the same functions as components in FIG. 1 have are also given the same reference numerals, and components corresponding to components in FIG. 1 are given the same reference numerals with "C" added thereto.

In FIG. 8, image sensor 16C is a solid state imaging device of one chip in which three CCD arrays 16R, 16G and 16B are integrated as image sensor 16 in FIG. 3. However, in image sensor 16C, CCD arrays 16R, 16B and 16G are arranged parallel with each other in the sub scanning direction with a pitch of 12 lines being provided so as to read an image of R, B, and G in that order.

In FIG. 7, photoelectric transfer signals S0 of respective colors of R, B and G provided from image sensor 16C are quantized by input processing part 202, and then shading correction is performed on them, and they are provided as image data DR, DG and DB of 8 bits.

Image data DR is delayed by 12 lines by FIFO memory 212C and applied to color discrimination ROM 213C, and image data DB is applied to color discrimination ROM 213C without being delayed. Image data DG is transmitted as image data read from an image of the original to an image processing part 204.

Color discrimination ROM 213C discriminates the color of the image of the original for every pixel on the basis of image data DR and DB of two colors of R and B and specified color data D12 applied from CPU 201. Data of two bits indicating a value of color discrimination data DC to be an output is stored in address designated by values "0"-"3" of specified color data D12 and respective values of "0"-"255" of image data DR and DB in color discrimination ROM 213C.

Image discrimination data DC provided from color discrimination ROM 213C is delayed by data transmission time of 12 lines by FIFO memory 216 so as to be synchronized with the timing of image data DG and applied to a variable power processing part 240 in image processing part 204.

Image data DG and color discrimination data DC provided from image processing part 204 are provided as an image signal S1 and an editing signal S2, respectively, through an output interface 205 to a laser printer part LP.

According to each embodiment described above, image sensor 16, 16C serves both for reading of an image and for color discrimination, and one image data DG out of image data DR, DG and DB of R, G and B obtained by color separation by a spectroscopic filter is provided as image signal S1 read from an image of the original, so that deterioration in image data is suppressed, and repeatability of an image of the original can be enhanced as compared with the conventional case where optical color separation is performed, and then data having the color synthesized by signal processing is made to be an image signal.

According to each embodiment described above, image sensor 16, 16C of one chip in which CCD arrays 16R, 16G and 16B corresponding to R, G and B are integrated is used, so that relative positional precision of light receiving surfaces of respective colors is high, and effects of lens aberration and temperature change are small as compared with a case where image sensors are provided separately for respective colors, and it is possible to obtain image data DR, DG and DB in which the color of an image of the original is correctly separated.

Accordingly, there is no error in color discrimination, and there is no color ghost due to erroneous discrimination.

According to the second embodiment described above, it is possible to make the circuitry configuration of signal processing part 20B more simple as compared with the first embodiment. In addition, color discrimination is performed by CCD array 16G in the central column and CCD array 16R or 16B adjacent thereto, and input to FIFO memory 212B is changed over by selector 214, so that not only is FIFO memory 203 for adjusting the timing of color discrimination data DC and the timing of image data DG unnecessary, but also the storage capacity of FIFO memory 212B becomes half the storage capacity of FIFO memory 212, and it is possible to reduce costs.

According to the third embodiment described above, the storage capacity of FIFO memory 216 provided for adjusting the timing of color discrimination data DC and the timing of image data DG may be a capacity capable of delaying data of two bits by data transmission time of 12 lines, and it is possible to reduce the storage capacity as compared with FIFO memory 203 in the first embodiment having a capacity capable of delaying data of 8 bits by data transmission time of 12 lines even if the purpose of application is the same.

In each embodiment described above, it is also possible to use delaying means other than a FIFO memory, a flip-flop circuit, for example, as means for adjusting the timing of data transmission.

In each embodiment described above, color discrimination for a pixel to be noted may be performed with reference to a result of color discrimination of a pixel on the periphery of the pixel to be noted.

Although image sensor 16, 16C of a reduction type in which CCD arrays 16R, 16G and 16B corresponding to R, G and B are arranged with a constant pitch in the sub scanning direction has been described in each embodiment described above, reading and color discrimination of an image of the original may be also performed using an image sensor of a closely contact type in which a light receiving region corresponding to one pixel is divided into three, and filters transmitting light of R, G and B are provided.

Although image reader part IR incorporated in copying machine 1 is illustrated as an image reading apparatus in each embodiment described above, the present invention can be also applied to an image reading apparatus constituting a filing system together with an external host computer or the like. In such a case, a signal indicating a specified color of image editing is applied from the host computer.

Although it is possible to obtain an image signal faithful to an actual image density in each embodiment described above because image data DG of green having the largest spectral luminance efficiency is used as image signal S1 indicating the image density, it is also possible to use image data of other colors or image data which has not passed through a spectroscopic filter as image signal S according to purposes of application.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
    image reading means including a color image sensor in which three CCD arrays arranged parallel with each other for reading different color components included in an image of the original, respectively, are integrally formed on one chip, each of said CCD arrays reading the image of the original by a predetermined number of pixels to provide image data;
    scanning means for moving said color image sensor and the image of the original relatively in a direction transverse to said CCD arrays;
    color discrimination means for discriminating the color of the image of the original for every pixel on the basis of image data from at least two of said CCD arrays included in said image reading means; and
    provision means for providing image data from a particular one of said CCD arrays included in said image reading means and a discrimination result from said color discrimination means in synchronism with each other.

2. The image reading apparatus according to claim 1, wherein said three CCD arrays provide image data corresponding to images of red, green and blue, respectively, and said particular one CCD array provides image data corresponding to the image of green.

3. An image reading apparatus, comprising:
    a color image sensor having first, second and third photoelectric transfer element arrays arranged parallel with each other for reading images of different colors, respectively, for reading an image of the original by a predetermined number of pixels to provide image data having the color separated into three color components;
    scanning means for moving said color image sensor and the image of the original relatively in a direction which is transverse to said photoelectric transfer element arrays so that the third array reads the image latest;
    color discrimination means for discriminating the color of the image of the original for every pixel on the basis of image data from said first and second photoelectric transfer element arrays;
    delaying means for delaying a discrimination result from said color discrimination means to synchronize the discrimination result with image data from said third photoelectric transfer element array; and
    provision means for providing the image data from said third photoelectric transfer element array and the discrimination result delayed by said delaying means in synchronism with each other.

4. The image reading apparatus according to claim 3, wherein each of said photoelectric transfer element arrays includes a CCD.

5. The image reading apparatus according to claim 3, wherein said first, second and third photoelectric transfer element arrays provide image data corresponding to respective color components of red, blue and green of the image, respectively.

6. The image reading apparatus according to claim 3, wherein said first, second and third photoelectric transfer element arrays provide image data corresponding to respective color components of blue, red and green of the image, respectively.

7. An image reading apparatus, comprising:
    a color image sensor having three photoelectric transfer element arrays arranged parallel with each other for reading respective color components of red, blue and green of an image by a predetermined number of pixels for reading the image of the original in the order of the color components of red, blue, and green or in the order of the color components of blue, red, and green to provide image data corresponding to respective color components;

color discrimination means for discriminating the color of the image of the original for every pixel on the basis of the image data corresponding to color components of red and blue provided from said color image sensor to provide color data indicating the colors of respective pixels;

delaying means for delaying the color data provided from said color discrimination means; and provision means for providing image data corresponding to the color component of green provided from said color image sensor and the color data delayed by said delaying means in synchronism with each other.

8. An image reading apparatus, comprising:

image reading means having a plurality of photoelectric transfer element arrays arranged parallel with each other, each of said photoelectric transfer element arrays reading an image of the original by a predetermined number of pixels to provide image data;

scanning means for moving said image reading means and the image of the original relatively in a direction transverse to said photoelectric transfer element arrays;

color discrimination means for discriminating the color of the image of the original for every pixel on the basis of the image data from at least two of said photoelectric transfer element arrays; and output means for outputting the image data from an array out of said plurality of photoelectric transfer element arrays which performs reading of the image of the same line last and for outputting a discrimination result from said color discrimination means in synchronism with the output image data.

9. The image reading apparatus according to claim 8, wherein each of said photoelectric transfer element arrays includes a CCD.

10. The image reading apparatus according to claim 8, wherein said image reading means includes a color image sensor of the one-chip type in which three CCD arrays for reading different color components included in the image of the original, respectively, are formed integrally on one chip.

11. An image reading apparatus, comprising:

a color image sensor for reading an image of the original with the color being separated into at least three or more colors to provide image data corresponding to respective separated colors;

specifying means for specifying a particular color;

data selecting means for selecting image data corresponding to each of two or more colors out of said image data provided from said color image sensor in accordance with the specified color specified by said specifying means; and color discrimination means for discriminating the color of each pixel of the image of the original on the basis of each of the image data selected by said data selecting means.

12. The image reading apparatus according to claim 11, further comprising:

data delaying means for delaying image data corresponding to at least one color to synchronize the image data selected by said data selecting means; and changing means for changing image data to be delayed by said delaying means in accordance with the specification of color performed by said specifying means.

13. An image reading apparatus, comprising:

a color image sensor having three photoelectric transfer element arrays arranged parallel with each other in a sub scanning direction of scanning of the original for reading an image of the original with the color being separated into three colors to provide image data corresponding to respective separated colors;

specifying means for specifying a particular color;

data selecting means for selecting image data corresponding to one of said photoelectric transfer element arrays in the front row or in the last row in the sub scanning direction in accordance with said specified color specified by said specifying means;

data transmission delaying means for adjusting relative transmission timing of the image data selected by said data selecting means and of the image data corresponding to one of said photoelectric transfer element arrays in the middle row in the sub scanning direction; and color discrimination means for discriminating the color of each pixel in the image of the original on the basis of the image data of two colors having the transmission timing adjusted by said data transmission delaying means.

14. The image reading apparatus according to claim 13, wherein, when said image data corresponding to one of said photoelectric transfer element arrays in the front row is selected by said data selecting means, said data transmission delaying means delays the image data corresponding to one of said photoelectric transfer element arrays in the front row, and, when said image data corresponding to one of said photoelectric transfer element arrays in the last row is selected by said data selecting means, said data transmission delaying means delays the image data corresponding to one of said photoelectric transfer element arrays in the middle row.

15. The image reading apparatus according to claim 13, wherein each of said photoelectric transfer element arrays includes a CCD.

16. The image reading apparatus according to claim 13, wherein said three photoelectric transfer element arrays provide image data corresponding to respective separated colors of red, green and blue of the image, respectively, and one of said photoelectric transfer element arrays in the middle row provides image data corresponding to the separated color of green.

17. The image reading apparatus according to claim 13, wherein said color image sensor includes a color image sensor of the one-chip type in which three CCD arrays for reading different color components included in the image of the original, respectively, are formed integrally on one chip.

* * * * *